(12) United States Patent
Park

(10) Patent No.: US 10,788,980 B2
(45) Date of Patent: Sep. 29, 2020

(54) APPARATUS AND METHOD FOR DISPLAYING APPLICATION

(71) Applicant: Samsung Electronics Co., Ltd., Suwon-si (KR)

(72) Inventor: Ji-hun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 730 days.

(21) Appl. No.: 14/857,505

(22) Filed: Sep. 17, 2015

(65) Prior Publication Data

US 2016/0077720 A1    Mar. 17, 2016

(30) Foreign Application Priority Data

Sep. 17, 2014    (KR) .................. 10-2014-0123713

(51) Int. Cl.
*G06F 3/0488*    (2013.01)
*G06F 3/0481*    (2013.01)

(52) U.S. Cl.
CPC ...... *G06F 3/04883* (2013.01); *G06F 3/04817* (2013.01)

(58) Field of Classification Search
CPC .................. G06F 3/04883; G06F 3/04817
See application file for complete search history.

(56) References Cited

U.S. PATENT DOCUMENTS

| | | | | |
|---|---|---|---|---|
| 5,732,275 A | * | 3/1998 | Kullick | .................... G06F 8/65 717/170 |
| 6,380,954 B1 | * | 4/2002 | Gunther | ............... G06F 17/211 715/764 |
| 7,328,411 B2 | | 2/2008 | Satanek | |
| 7,774,718 B2 | | 8/2010 | Finke-Anlauff et al. | |
| 7,958,456 B2 | | 6/2011 | Ording et al. | |
| 8,412,150 B2 | | 4/2013 | Louch | |
| 2011/0145759 A1 | * | 6/2011 | Leffert | ............... G06F 3/04845 715/800 |
| 2011/0265028 A1 | | 10/2011 | Hong et al. | |
| 2013/0145244 A1 | | 6/2013 | Rothschiller et al. | |
| 2014/0068477 A1 | | 3/2014 | Roh | |
| 2015/0113428 A1 | * | 4/2015 | Liu | .................... G06F 3/04817 715/745 |

FOREIGN PATENT DOCUMENTS

| | | |
|---|---|---|
| CN | 102436335 A | 5/2012 |
| KR | 20140021413 A | 2/2014 |

* cited by examiner

*Primary Examiner* — Jennifer N To
*Assistant Examiner* — Ashley M Fortino

(57) ABSTRACT

A method of displaying an application includes: receiving a user input for a size change of an application icon displayed on a screen; determining a widget corresponding to a changed size from a widget list related to the application icon; and displaying an execution window of the determined widget.

16 Claims, 22 Drawing Sheets

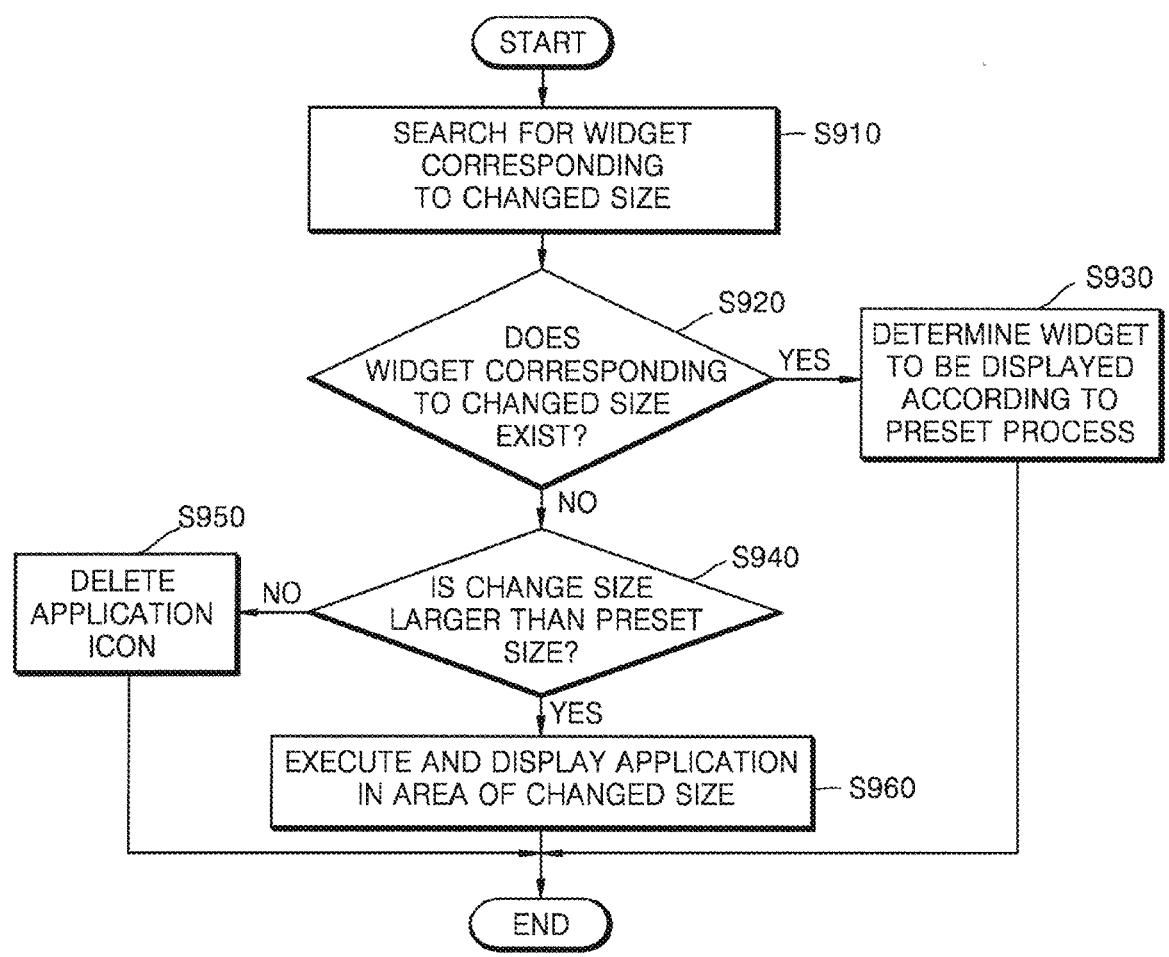

APPARATUS AND METHOD FOR DISPLAYING APPLICATION

CROSS-REFERENCE TO RELATED APPLICATION(S) AND CLAIM OF PRIORITY

The present application is related to and claims the benefit of Korean Patent Application No. 10-2014-0123713, filed on Sep. 17, 2014, in the Korean Intellectual Property Office, the disclosure of which is incorporated herein in its entirety by reference.

TECHNICAL FIELD

The present disclosure relates to methods and apparatuses for displaying an application.

BACKGROUND

A widget is recently provided so as to immediately use functions of weather, calendar, calculator, etc. without a web browser. Therefore, icon and widget execution windows may be variously arranged to make a wallpaper.

However, when an application is installed in a mobile terminal, the widget is generally automatically installed before a user recognizes it. An execution icon also exists in a space separate from an application execution icon. Also, a process of adding the widget is performed separately from an addition of an application icon to add the widget on the wallpaper. These limits lower a utilization of the widget.

If several widgets for an application and an application icon are reciprocally changed through changes in their sizes or the like, a considerable part of the above-described limits may be overcome.

SUMMARY

To address the above-discussed deficiencies, it is a primary object to provide, for use in a wireless communication system, methods and apparatuses for displaying an application. Additional aspects will be set forth in part in the description which follows and, in part, will be apparent from the description, or may be learned by practice of the presented embodiments.

According to certain embodiments, a method of displaying an application includes: receiving a user input for a size change of an application icon displayed on a screen; determining a widget corresponding to a changed size among at least one widget of an application corresponding to the application icon; and displaying an execution window of the determined widget.

The method may further include: receiving a user input for a size change of the execution window of the widget; determining the application icon corresponding to a changed size of the execution window of the widget; and displaying the application icon.

If a widget corresponding to the changed size does not exist, the method may further include: if the changed size is smaller than a preset size, deleting the application icon from the screen; and if the changed size is larger than or equal to the preset size, executing the application in an area of the changed size.

The receiving of the user input may include: searching for at least one widget corresponding to the application; and displaying an execution window size of the searched at least one widget as a guide image.

The widget corresponding to the changed size may be manually determined by a user input or may be automatically determined according to a preset rule.

Horizontal and vertical lengths may be changed in a preset size unit according to the user input for the size change.

The user input may be performed by a hand of a user or an input device such as a touchable tool, a keyboard, or a mouse.

The receiving of the user input may include receiving a selection of the application icon through a single touch, a single long touch, a multi-touch, a multi long touch, or an untouched input.

The receiving of the user input may include displaying a size control box around the application icon.

According to certain embodiments, a method of displaying an application includes: receiving a user input for a size change of a widget execution window; determining a widget corresponding to a changed size of the widget execution window among at least one widgets of an application indicated by the widget execution window; and displaying an execution window of the determined widget.

According to certain embodiments, an apparatus for displaying an application includes: an input device configured to receive a user input for a size change of an application icon displayed on a screen; a processor configured to determine a widget corresponding to a changed size among at least one widgets of an application corresponding to the application icon; and a display configured to display an execution window of the determined widget.

The input device may receive a user input for a size change of a widget execution window, the processor may determine a widget corresponding to a changed size of the widget execution window among at least one widget of an application indicated by the widget execution window, and the display may display an execution window of the determined widget.

The input device may receive a user input for a size change of a widget execution window, the processor may determine the application icon corresponding to a changed size of the widget execution window, and the display may display the application icon.

If a widget corresponding to the changed size does not exist, the processor may delete the application icon from the screen if the changed size is smaller than a preset size and execute the application in an area of the changed size if the changed size is larger than or equal to the preset size.

The processor may search for at least one widget corresponding to the application, and the display may display an execution window size of the searched at least one widget as a guide image.

The processor may manually determine a widget corresponding to the changed size through a user input or automatically determine the widget according to a preset rule.

The input device may receive the user input to change horizontal and vertical lengths in a preset size unit.

The input device may receive the user input through a hand of a user or an input device such as a touchable tool, a keyboard, or a mouse.

The input device may receive a selection of the application icon through a single touch, a single long touch, a multi-touch, a multi long touch, or an untouched input.

The display may display a size control box around the application icon.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 illustrates a method of determining an object to be displayed based on whether a widget corresponding to a changed size exists, according to embodiments of the present disclosure;

DETAILED DESCRIPTION

Figure 1:
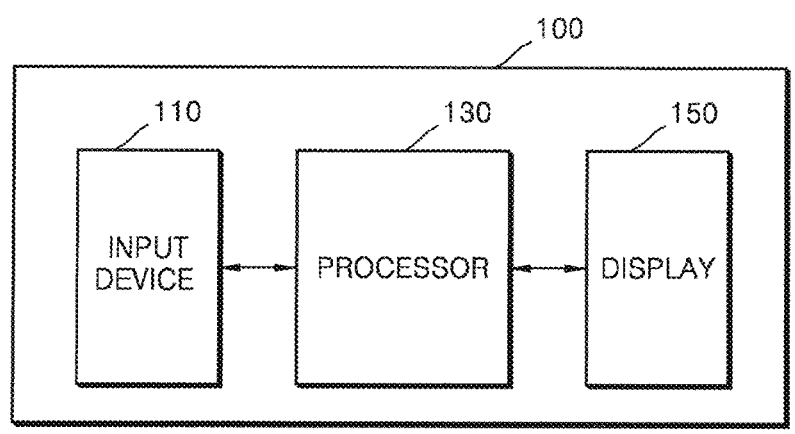
FIG. 1 illustrates a block diagram of an apparatus for displaying an application according to embodiments of the present disclosure.

FIGS. 1 through 14B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

The terms used herein will be described in brief, and the embodiments will be described in detail.

The terms used herein are general terms that are currently widely used in consideration of functions in the embodiments, but may vary according to intentions of those of ordinary skill in the art, precedents, appearances of new technologies, or the like. Also, the applicant may select terms in a particular case, and meanings of the teams corresponding to this case will be described in detail in the description of the present disclosure. Therefore, the terms used herein may be defined based on meanings thereof and the overall contents of the embodiments not based on names of simple terms.

When a part "comprises" an element in the specification, this may mean that the part may not exclude and may further include other elements as long as there is no contrary description. The term "unit" used herein refers to a hardware element such as field-programmable gate array (FPGA) or application-specific integrated circuit (ASIC) and performs any role. However, the term "unit" is not limited to software or hardware. The "unit" may be constituted to be in a storage medium that may be addressed or may be constituted to play one or more processors. Therefore, for example, the "unit" includes elements, such as software elements, object-oriented elements, class elements, and task elements, processes, functions, attributes, procedures, sub routines, segments of a program code, drivers, firmware, a microcode, a circuit, data, a database (DB), data structures, tables, arrays, and parameters. Functions provided in elements and "units" may be combined as the smaller number of elements and "units" or may be separated as additional elements and "units".

A "widget" used herein refers to a mini application that is made so as to immediately use functions of weather, calendar, calculator, news, games, stock information, etc. in a personal computer (PC), a portable phone, a blog, an Internet café, or the like without a web browser.

Also, a "mobile terminal" refers to portable computing devices including a portable phone, a smartphone, a tablet PC, a laptop PC, a portable multimedia player (PMP), a personal digital assistant, etc.

FIG. 1 illustrates a block diagram of an apparatus 100 for displaying an application according to embodiments of the present disclosure.

Referring to FIG. 1, the apparatus 100 may include an input device 110 that receives a user input for a size change of an application icon displayed on a screen, a processor 130 that determines a widget corresponding to a changed size among at least one widgets of an application corresponding to the application icon, and a display 150 that displays an execution window of the determined widget.

According to certain embodiments, the input device 110 may receive a user input for a selection of a target application icon before receiving the size change of the application icon.

Here, the input device 110 may receive a user input through a hand of a user or an input device such as a touchable tool, a touch pen, a keyboard, or a mouse.

However, the receiving of the user input for the application icon is not limited to this method, and thus various types of inputs may be executed.

The user input 110 may receive a user input through a single touch, a single long touch, a multi-touch, a multi long touch, or an untouched input.

The "untouched input" used herein is referred to as methods of receiving a user input without a touch, like an eye recognition, light sensing of a light irradiation, or the like.

The processor 130 may exist in a laptop PC, a personal data assistant (PDA), or a mobile terminal such as a portable phone or the like or may exist independently from a mobile terminal such as a laptop PC or the like.

The processor 130 may include a searcher that searches for a widget corresponding to the changed size amount the at least one widgets of the application corresponding to the application icon and a determiner that determines a widget to be displayed, based on the searched result.

According to another embodiment, the input device 110 may receive a user input for a size change of a widget execution window. Here, the processor 130 may determine a widget corresponding to a changed size of the widget execution window among at least one widgets of an application indicated by the widget execution window. The display 150 may display an execution window of the determined widget.

According to another embodiment, the input device 110 may receive a user input for a size change of a widget execution window. Here, the processor 130 may determine an application icon corresponding to a changed size of the widget execution window. The display 150 may display the determined application icon.

Therefore, the apparatus 100 may receive a user input for enlarging an application icon to determine a widget corresponding to a changed size and display an execution window of the determined widget. The apparatus 100 may also receive a user input for enlarging or reducing a widget execution window to determine another widget corresponding to a changed size and display an execution window of the determined widget. Alternatively, the apparatus 100 may receive a user input for reducing a size of a widget execution window to determine an application icon corresponding to the reduced size and display the determined application icon.

In other words, through a size control, an application icon may be freely changed into a widget, the widget may be freely changed into another widget, or the widget may be freely changed into an application icon.

Figure 2:
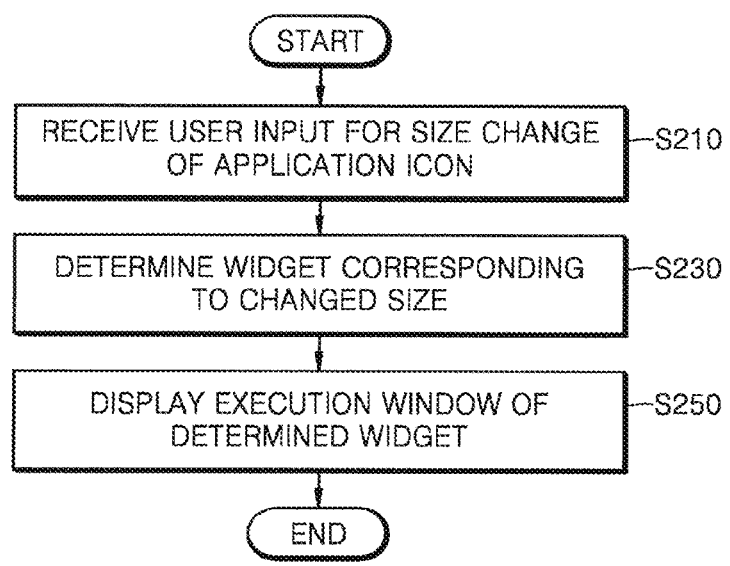
FIG. 2 illustrates a method of displaying an application according to embodiments of the present disclosure.

FIG. 2 illustrates a method of displaying an application according to embodiments of the present disclosure.

In operation S210, the apparatus 100 receives user input for a size change of an application icon displayed on a screen.

According to certain embodiments, operation S210 may include an operation of receiving a user input for a selection of a target application icon from application icons displayed on the screen.

The operation of receiving the user input for the selection of the target application icon is an operation of selecting a target application icon that will execute a preset function through a size change.

According to certain embodiments, the apparatus 100 may receive a user input for size changes of all selectable objects displayed on the screen, such as the application icon, a widget icon, a widget execution window, an application execution window, etc.

According to an certain embodiments, a size control box may be displayed around a selected application icon to induce a size change.

If a widget of an application corresponding to the selected application icon does not exist, the apparatus 100 may not display the size control box.

According to certain embodiments, horizontal and vertical lengths may be changed in a preset size unit to perform the size change.

In operation S230, the apparatus 100 determines a widget corresponding to a changed size among widgets of the application corresponding to the application icon.

According to certain embodiments, operation S230 may include an operation of searching for the widget corresponding to the changed size among the widgets of the application corresponding to the application icon.

Searching may be performed with respect to all widgets of a corresponding application installed in the apparatus 100 or the application icon.

The searching may also be performed with respect to a widget and application icon stored in a remote device such as an external server or the like.

Among the widgets of the application corresponding to the application icon, one or more widgets corresponding to the changed size may exist or a widget corresponding to the changed may not exist.

If a plurality of widgets corresponding to the changed size exist among the widgets of the application corresponding to the application icon, an application icon to be displayed may be determined among the plurality of widgets that are searched.

A widget to be displayed may be determined through a user input or may be automatically determined according to a preset rule.

If the widget to be displayed is manually determined through a user input, a plurality of widgets may be displayed in pop-up forms to receive a user selection for a displayed widget.

In operation S250, the apparatus 100 displays an execution window of the determined widget.

Displaying of the determined widget may be performed simultaneously with adding of the determined widget onto a wallpaper in a mobile terminal loading an ANDROID platform.

Figure 3A:
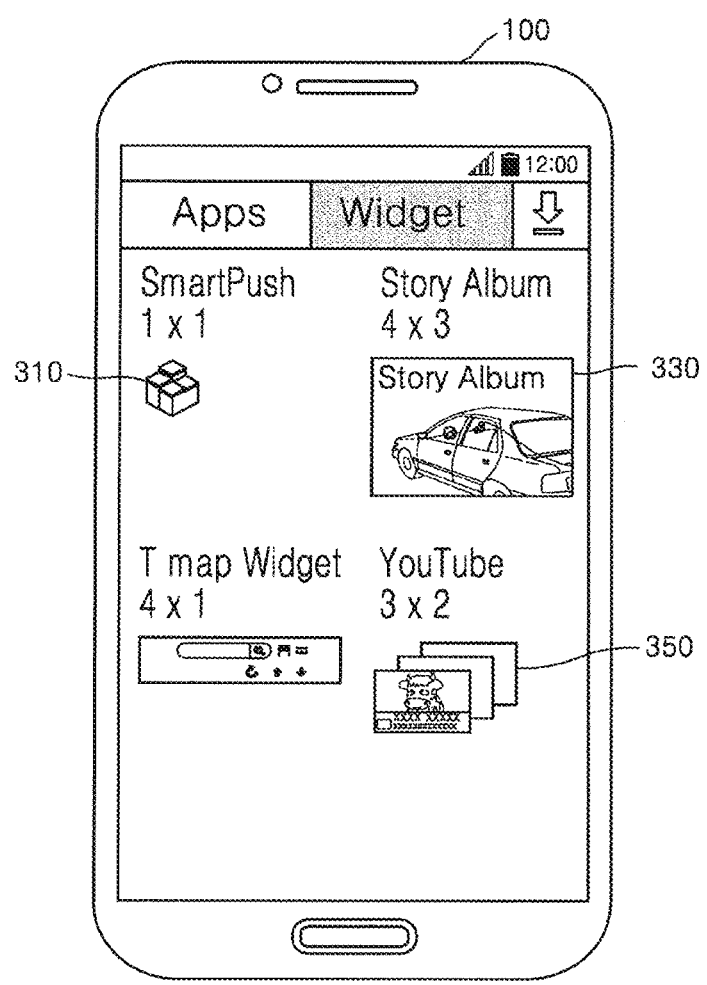
FIG. 3A illustrates widget icons according to embodiments of the present disclosure.

FIG. 3A illustrates widget icons according to embodiments of the present disclosure.

As shown in FIG. 3A, a widget 310 of application SmartPush has an execution window of size 1×x1, a widget 330 of application Story Album has an execution window of size 4×3, and a widget 350 of application YouTube has an execution window of size 3×2.

In a mobile terminal loading an ANDROID platform, a widget of each application may exist in an icon form having an execution window of various sizes such as 1×1, 4×3, 4×1, 3×2, etc. in an app drawer. Size types of 1×1, 4×3, 4×1, and 3×2 will be respectively accurately described later with reference to FIG. 4.

Figure 3B:
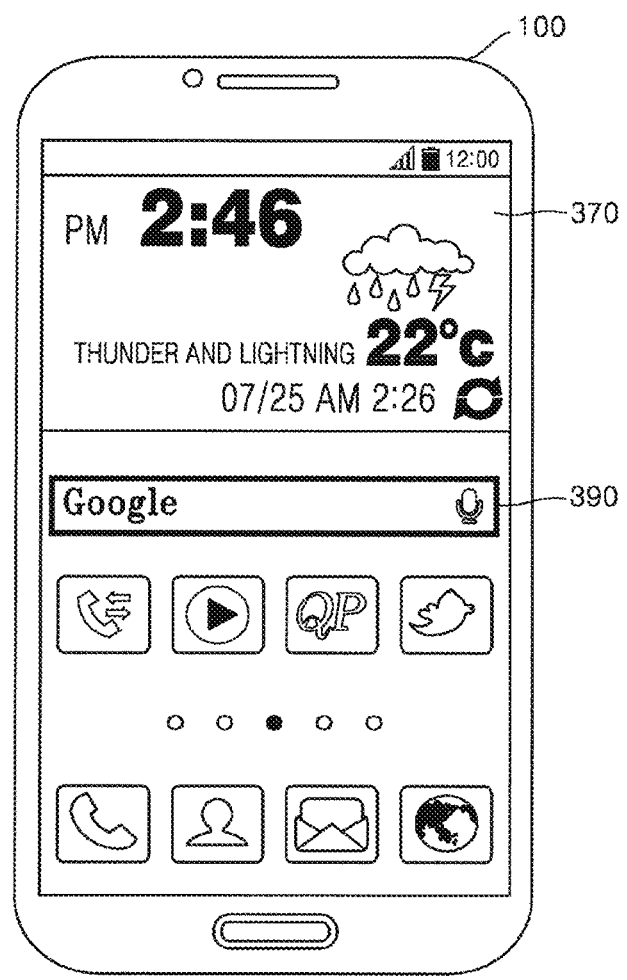
FIG. 3B illustrates widget execution windows according to embodiments of the present disclosure.

FIG. 3B illustrates widget execution windows according to embodiment s of the present disclosure.

A widget execution window that displays results of executing widgets may be displayed in various sizes like a weather widget 370 of FIG. 3B, a GOOGLE search engine widget 390, etc.

Figure 4:
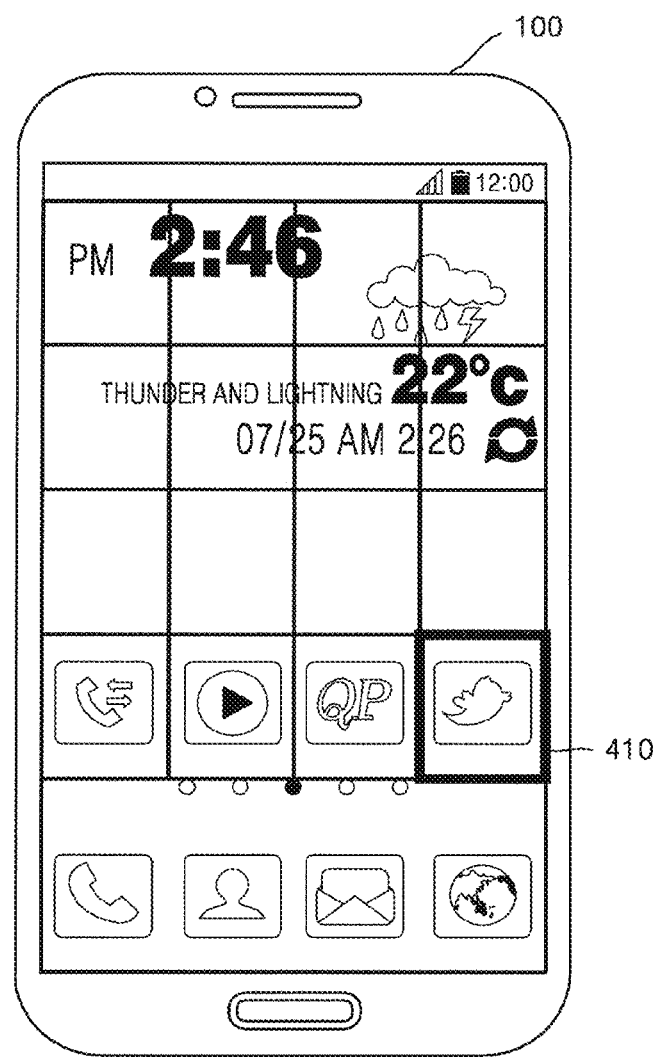
FIG. 4 illustrates a cell that is a size change unit according to embodiments of the present disclosure.

FIG. 4 illustrates a cell that is a size change unit according to embodiments of the present disclosure.

Changing of a size of an application icon may be performed in a preset size unit.

Here, the preset size unit may be a cell unit 410. A wallpaper, which may be displayed at a time, is divided into cell units 410 at a preset ratio.

Sizes of a widget icon and a widget execution window may be determined according to how many cells 410 are used.

In the present disclosure, in a mobile terminal loading an Intelligent Office System (IOS) platform of Apple Inc., a wallpaper refers to a whole space where an icon of an installed application may be displayed. In a mobile terminal loading an ANDROID platform, the wallpaper refers to a space that may be arbitrarily changed by a user and is distinguished from an app drawer. For example, a screen displayed in FIG. 3B is a wallpaper of a mobile terminal loading an ANDROID platform.

According to certain embodiments, in a mobile terminal loading an ANDROID platform, an area of a wallpaper that may be occupied by one widget icon or one widget execution window may be divided horizontally into 4 cells and vertically into 4 cells (i.e., into a total of 16 cells), as shown in FIG. 4.

In this example, each widget icon 310, 330, 350 or each widget execution window 370, 390 may occupy a maximum of 16 cells, starting from a minimum of one cell unit 410 and may occupy cells in rectangular shapes.

For example, size 4×2 of a widget indicates that the widget occupies 4 cells horizontally and 2 cells vertically (i.e., a total of 8 cells).

A weather widget 370 of FIG. 4 occupies 4 cells horizontally and 2 cells vertically and thus is a widget having a size of 4×2.

Figure 5:
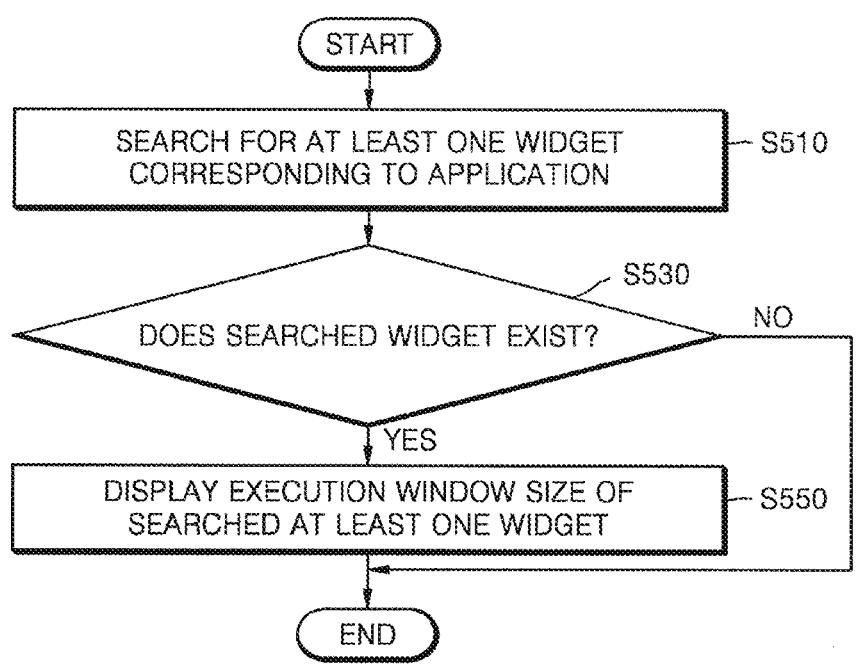
FIG. 5 illustrates a method of receiving a user input according to embodiments of the present disclosure.

FIG. 5 illustrates a method of receiving a user input according to embodiments of the present disclosure.

When receiving a user input for a size change of an application icon, the apparatus 100 may search for widgets of an application corresponding to the application icon and display a size of at least one searched widget as a guide image to a user.

In operation S510, the apparatus 100 searches for all widgets indicating an application corresponding to an application icon displayed on a screen.

In an embodiment where a widget is changed into another widget or into an application, the apparatus 100 may search for other widgets and application icons indicating an application corresponding to a widget execution window displayed on the screen.

In operation S530, the apparatus 100 determines whether a searched-for widget exists.

If it is determined that the searched-for widget exists, the apparatus 100 displays an execution window size of at least one searched-for widget as a guide image in operation S550.

This function pre-informs a user that widgets having what sizes are supported, so as to enable the user to conveniently use the widgets.

Figure 6:
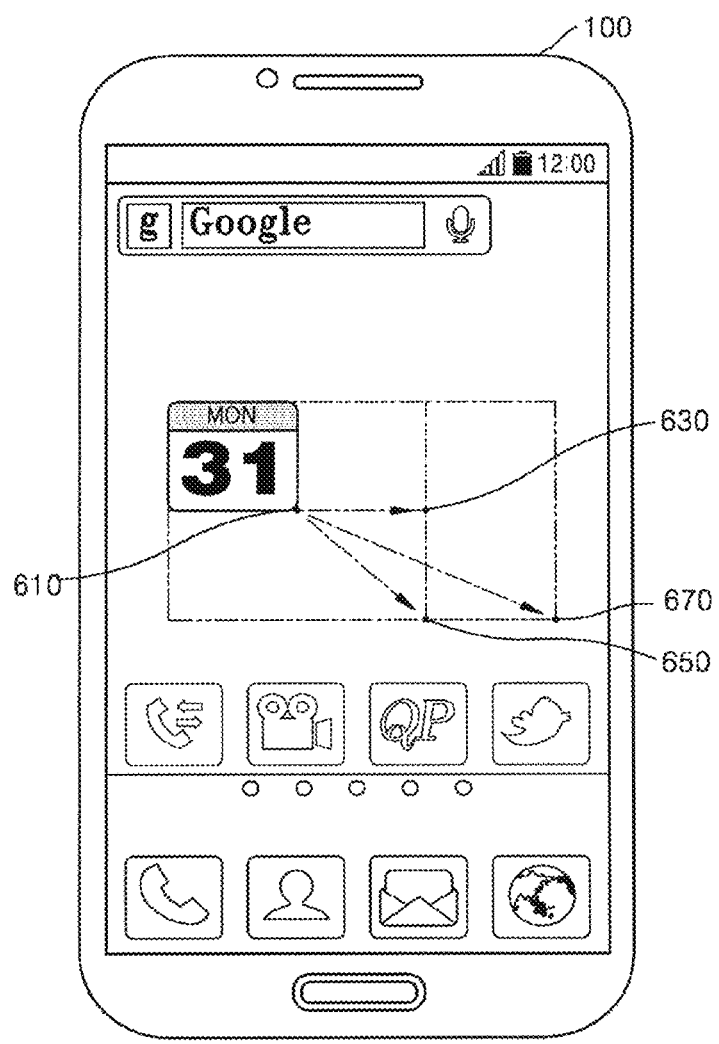
FIG. 6 illustrates a method of displaying a size of a searched widget as a guide image to a user according to embodiments of the present disclosure.

FIG. 6 illustrates a method of displaying a size of a searched-for widget as a guide image to a user according to embodiments of the present disclosure.

When receiving a user input for a size change of an application icon, the apparatus 100 searches for another widget of an application corresponding to the application icon besides a widget 610 that is currently displayed. If at least one searched-for widget exists, the apparatus 100 may display a size of the searched-for widget as a guide image to a user to assist the user with a size change.

As shown in FIG. 6, the apparatus 100 may display guide images of a widget 630 of size 1×2, a widget 650 of size 2×2, and a widget 670 of size 2×3, i.e., a total of three widgets.

In an embodiment where a widget displayed on a screen is changed into an application icon or into another widget, if a user selects a particular widget execution window to perform a size change, another widget execution window, application icon, etc. may be searched for beside the widget execution window, and sizes of searched objects may be displayed as guide images to the user.

If the user changes an application icon into a size of 1×2, the apparatus 100 may execute a widget having a size of 1×2 to display an execution window of the widget. If the user completes a size change into a size of 2×2, the apparatus 100 may execute a widget having a size of 2×2 to display an execution widow of the widget. If the user completes a size change into a size of 2×3, the apparatus 100 may execute a widget having a size of 2×3 to display an execution window of the widget.

When installing an application, a widget provided by an application developer is mostly automatically installed together with the application, unknown to the user. Therefore, when considering that the user does not foreknow widget information, providing of a size change guide image may increase a utilization of the apparatus 100.

Figure 7:
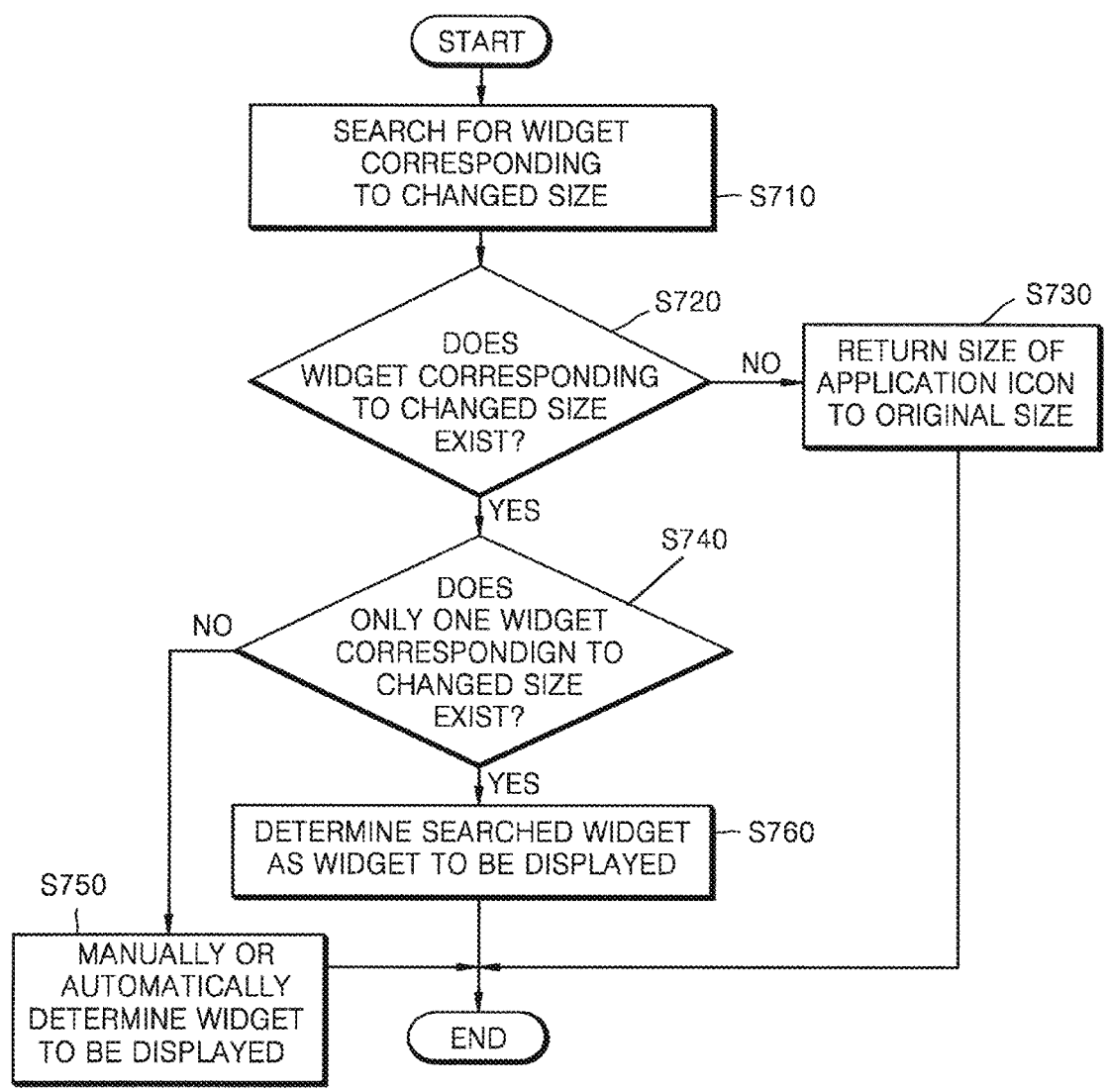
FIG. 7 illustrates a method of determining a widget to be displayed according to embodiment.

FIG. 7 illustrates a method of determining a widget to be displayed according to embodiments of the present disclosure.

In operation S710, the apparatus 100 searches for a widget corresponding to a changed size among widgets of an application corresponding to an application icon.

In operation S720, the apparatus 100 determines whether a widget corresponding to the changed size exists among the widgets of the application corresponding to the application icon.

If it is determined in operation S720 that the searched-for widget does not exist, the apparatus 100 returns a size of the application icon to an original size in operation S730.

According to certain embodiments, the apparatus 100 may perform a preset function according to a changed size. The preset function will be described later with reference to FIG. 9.

If one searched-for widget corresponding to the changed size exists in operation S740, the apparatus 100 determines a searched-for widget as a widget to be displayed in operation S760.

If a plurality of searched-for widgets corresponding to the changed size exist in operation S740, the apparatus 100 manually or automatically determines a widget to be displayed from the plurality of searched widgets in operation S750.

If a widget to be displayed is manually determined, the apparatus 100 may display searched widgets according to a method such as a pop-up method or the like so as to enable a user to select a widget.

Figure 8:
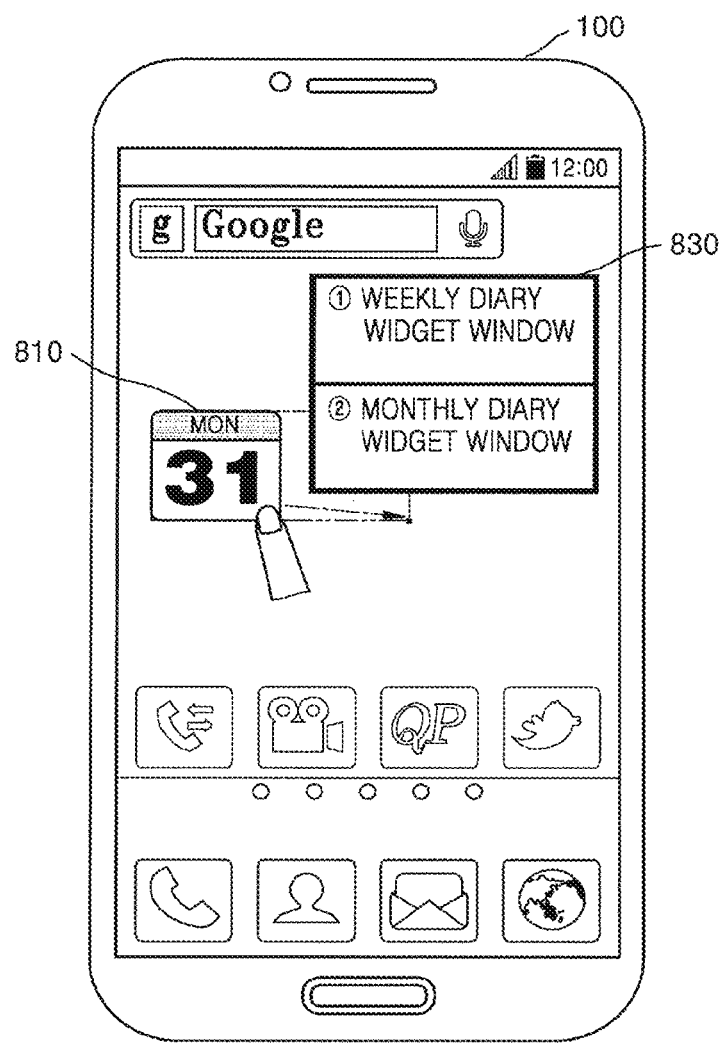
FIG. 8 illustrates a method of determining a widget to be displayed in a pop-up form according to embodiments of the present disclosure.

FIG. 8 illustrates a method of determining a widget to be displayed in a pop-up form according to embodiments of the present disclosure.

If the apparatus 100 receives a user input for changing a diary application icon 810 having a size of 1×1 into a size of 1×2, the apparatus 100 may determine whether a diary application supports a widget having a size of 1×2.

As a result of the determination, a weekly diary widget and a monthly diary widget (i.e., two widgets having sizes of 1×2), are supported.

In this case, the apparatus 100 may display a pop-up window 830 so as to enable the user to select whether to display a weekly diary widget execution window or a monthly diary widget execution window.

FIG. 9 illustrates a method of determining an object to be displayed, based on whether a widget corresponding to a changed size exists, according to embodiments of the present disclosure.

In operation S910, the apparatus 100 searches for a widget corresponding to a changed size among at least one widgets of an application corresponding to an application icon.

In operation S920, the apparatus 100 determines whether a widget corresponding to the changed size exists.

If it is determined in operation S930 that the widget corresponding to the changed size exists, the apparatus 100 determines a widget to be displayed, according to a preset process in operation S930. The preset process may be equal to the process described with reference to FIG. 7.

If it is determined in operation S920 that the widget corresponding to the changed size does not exist, the apparatus 100 determines whether the changed size is larger than a preset size in operation S940.

According to certain embodiments, the preset size may be a size of 1×1, which is a general size of an application icon.

If it is determined in operation S940 that the changed size is larger than or equal to the preset size, the apparatus 100 executes an application corresponding to the application icon in an area having the changed size in operation S960.

For example, the apparatus 100 may receive a user input for enlarging a video application icon in a size of 3×3 to determine whether a video application supports a widget having a size of 3×3. If there is no widget that is supported, the apparatus 100 may generate a window having a size of 3×3 and execute the video application in an area instead of changing an application icon into a widget having a size of 3×3.

In this case, a user may enjoy a multimedia content, such as a movie or the like, in a window having a size of 3×3 not in a whole screen. Therefore, the user may use other parts of a wallpaper to perform multitasking.

If it is determined in operation S940 that the changed size is smaller than the preset size, the apparatus 100 deletes the application icon from the wallpaper in operation S950.

According to certain embodiments, if a particular application is executed in operation S960, a window in which the particular application is executed may also be changed into a widget execution window or an application icon through a size change or the execution of the particular application may be ended.

Here, if a size of the window is changed to be smaller than a preset size, the apparatus 100 may end the execution of the corresponding application and delete the video application icon from the wallpaper.

If the size of the window in which the application is executed is changed into the same size as the preset size, the apparatus 100 may not delete the application icon from the wallpaper but may end only the execution of the application.

Figure 10A:
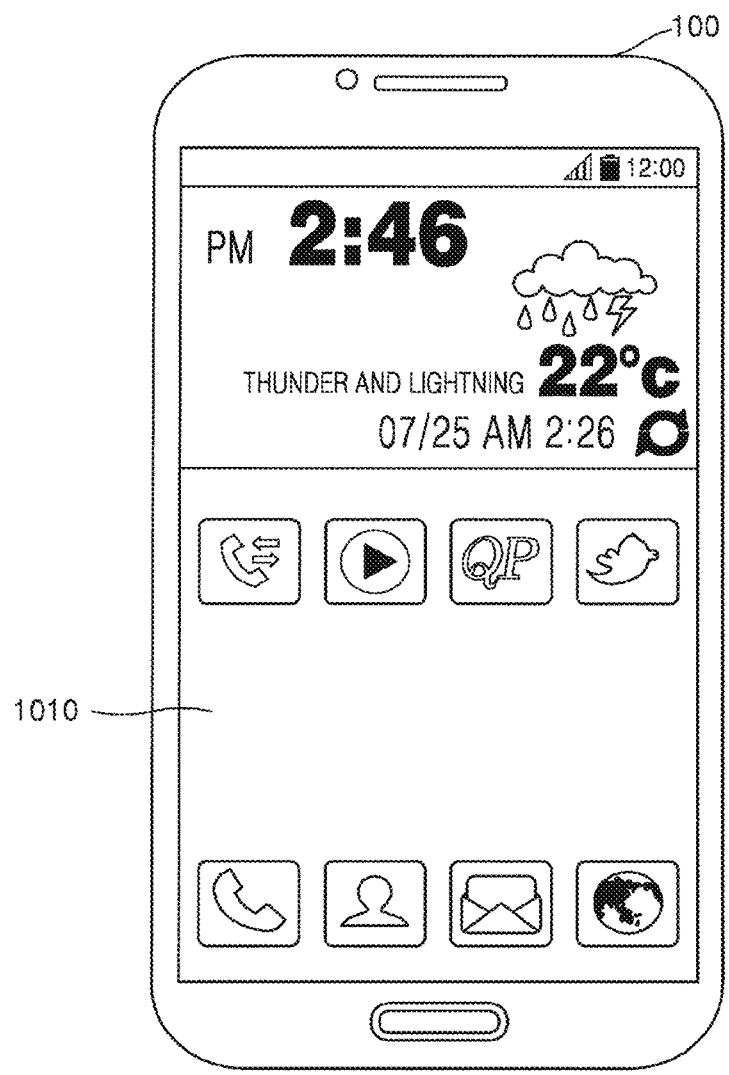
FIG. 10A illustrates a wallpaper of a smartphone according to embodiments of the present disclosure.

FIG. 10A illustrates a wallpaper of a smartphone according to embodiments of the present disclosure.

In a mobile terminal loading an ANDROID platform, a wallpaper 1010, which may be arbitrarily changed by a user like a window wallpaper, may be provided.

Figure 10B:
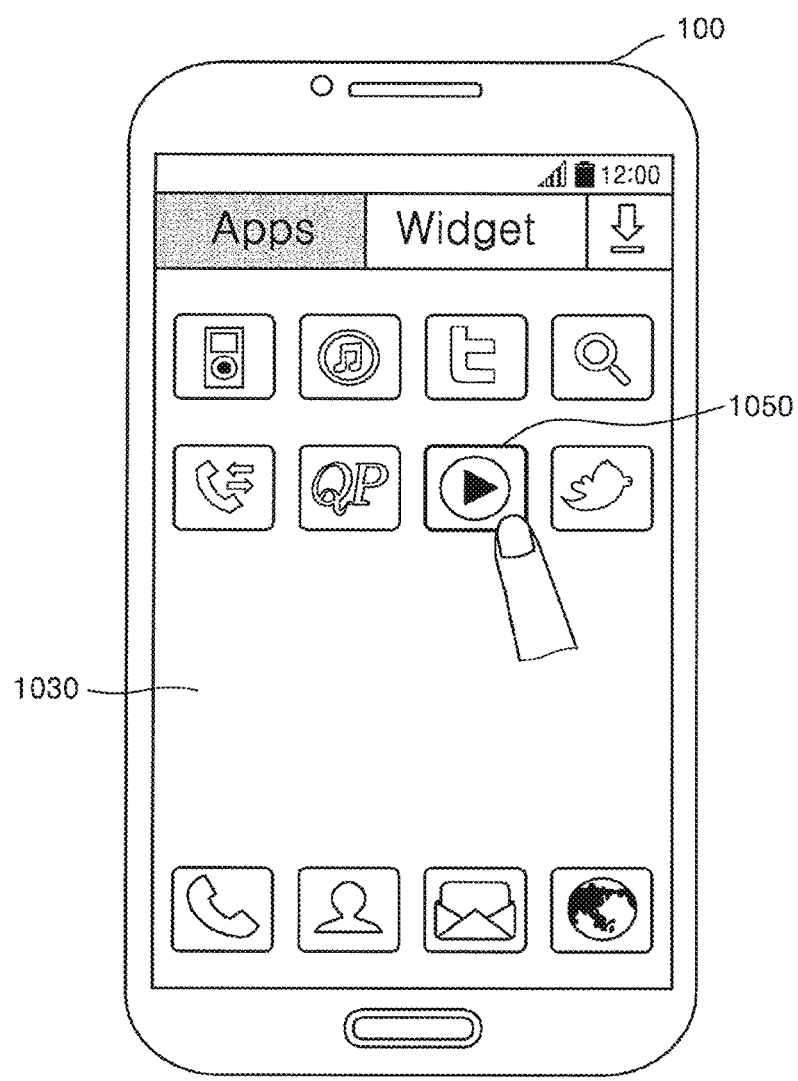
FIG. 10B illustrates an app drawer of a smartphone according to embodiments of the present disclosure.

FIG. 10B illustrates an app drawer of a smartphone according to embodiments of the present disclosure.

A user may select a video application icon 1050 from an app drawer 1030 that displays all of the applications and widgets installed in a mobile terminal.

Figure 10C:
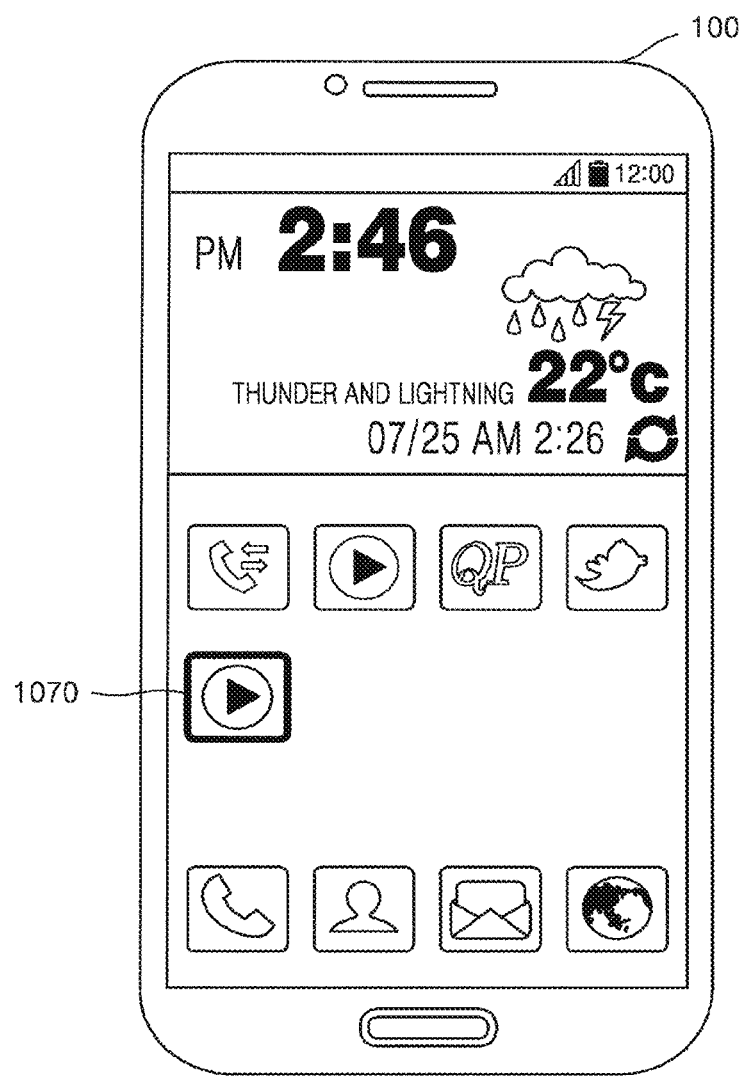
FIG. 10C illustrates a size control box that is displayed when an application icon is added onto a wallpaper of a smartphone, according to embodiments of the present disclosure.

FIG. 10C illustrates a size control box 1070 that is displayed when an application icon is added onto a wallpaper of a smartphone, according to embodiments of the present disclosure.

If an icon selection is completed with the video application icon 1050 as shown in FIG. 10B, a mobile terminal may add the video application icon 1050 onto a wallpaper 1010 and display the size control box 1070 around the added video application icon 1050.

Figure 10D:
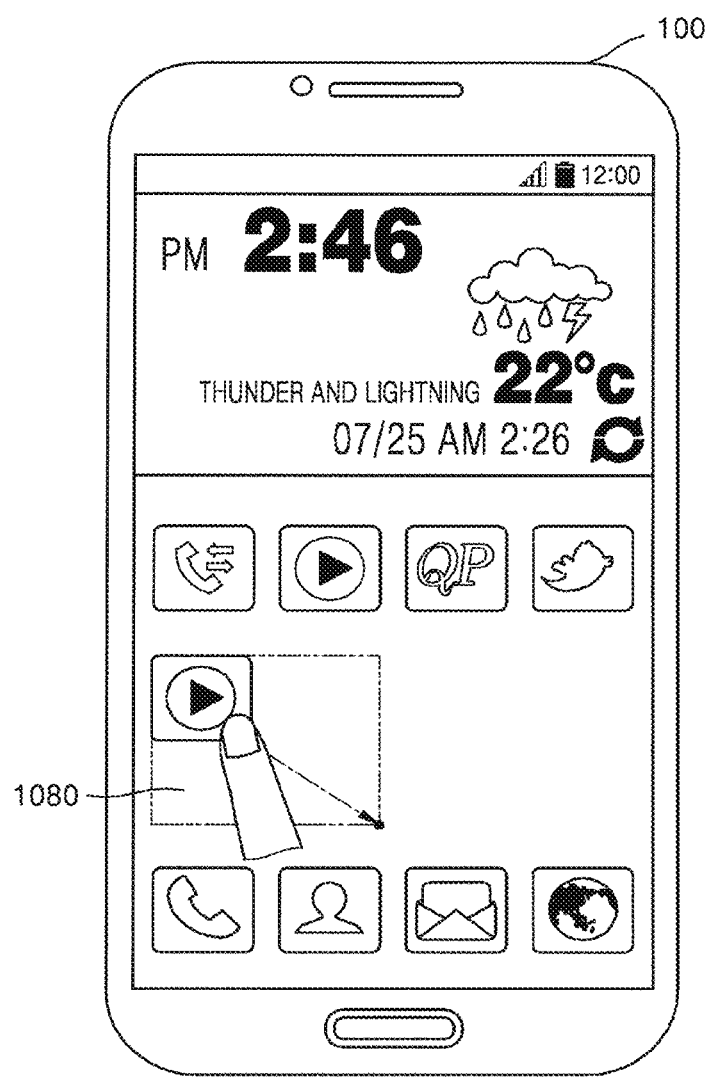
FIG. 10D illustrates a user input that is received for a size change after an application icon is added onto a wallpaper of a smartphone, according to embodiments of the present disclosure.

FIG. 10D illustrates a user input that is received for a size change after an application icon is added onto a wallpaper of a smartphone, according to embodiments of the present disclosure.

A user may change a video application icon having a size of 1×1 to occupy another sized space 1080 of size 2×2.

Figure 10E:
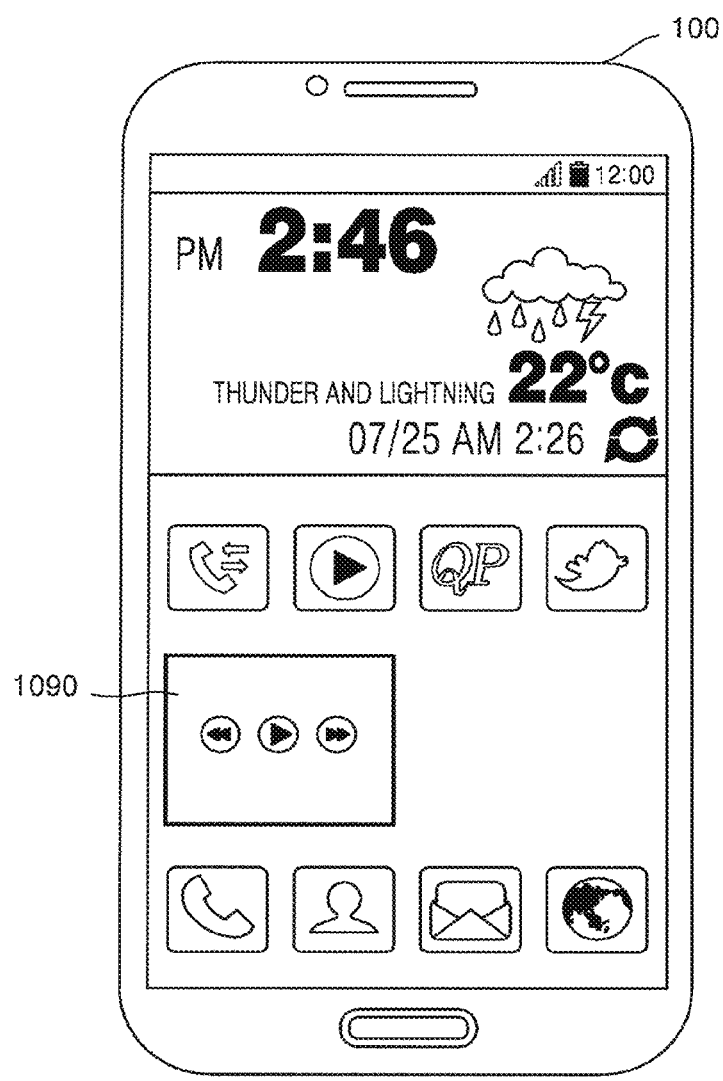
FIG. 10E illustrates a widget execution window that is displayed so as to correspond to a changed size, according to embodiments of the present disclosure.

FIG. 10E illustrates a widget execution window that is displayed so as to correspond to a changed size, according to embodiments of the present disclosure.

If a user changes a video application icon having a size of 1×1 into the space 1080 of size 2×2, the apparatus 100 may change a video application icon, which is added onto a wallpaper, into a video widget execution window 1090 having a size of 2×2.

Figure 11A:
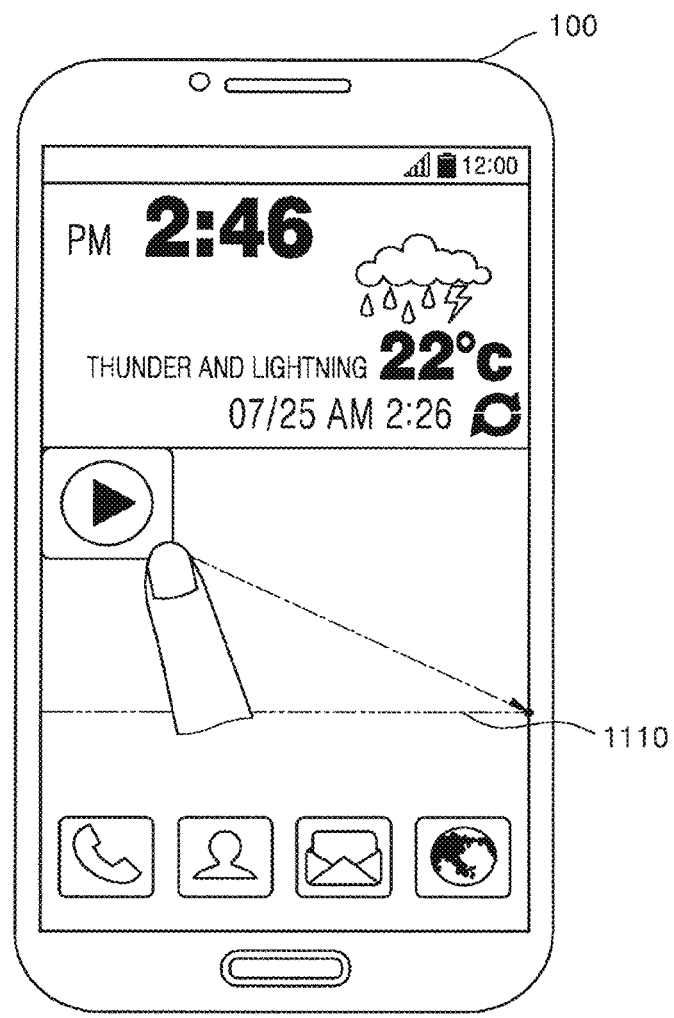
FIG. 11A illustrates a user input that is received for a size change after an application icon is added onto a wallpaper of a smartphone, according to embodiments of the present disclosure.

FIG. 11A illustrates a user input that is received for a size change after an application icon is added onto a wallpaper of a smartphone, according to embodiments of the present disclosure.

Figure 11B:
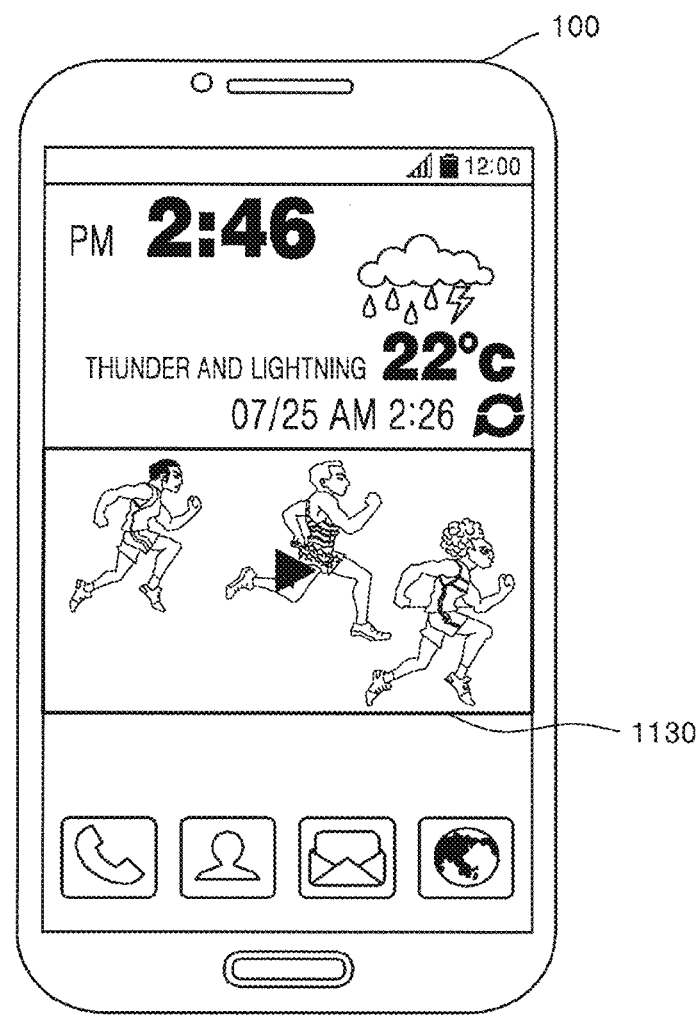
FIG. 11B illustrates an application execution window that is displayed so as to correspond to a changed size, according to embodiments of the present disclosure.

FIG. 11B illustrates an application execution window that is displayed so as to correspond to a changed size, according to embodiments of the present disclosure.

A user may select a video application icon from an app drawer to add an application icon or a widget onto a wallpaper.

If the selection is completed, a mobile terminal may add the video application icon onto the wallpaper and display a size control box 1070 around the video application icon 1050.

If the user changes the video application icon 1050 having a size of 1×1 into a space 1110 of size 2×4, the apparatus 100 searches for a widget having the size of 2×4 of the video application.

If a video widget corresponding to the size of 2×4 does not exist, the apparatus 100 may change the video application icon, which is added onto the wallpaper, into a window in which the video application is executed (i.e., a window 1130 that displays an execution of an image as shown in FIG. 11B, in a window having the size of 2×)4.

Figure 12:
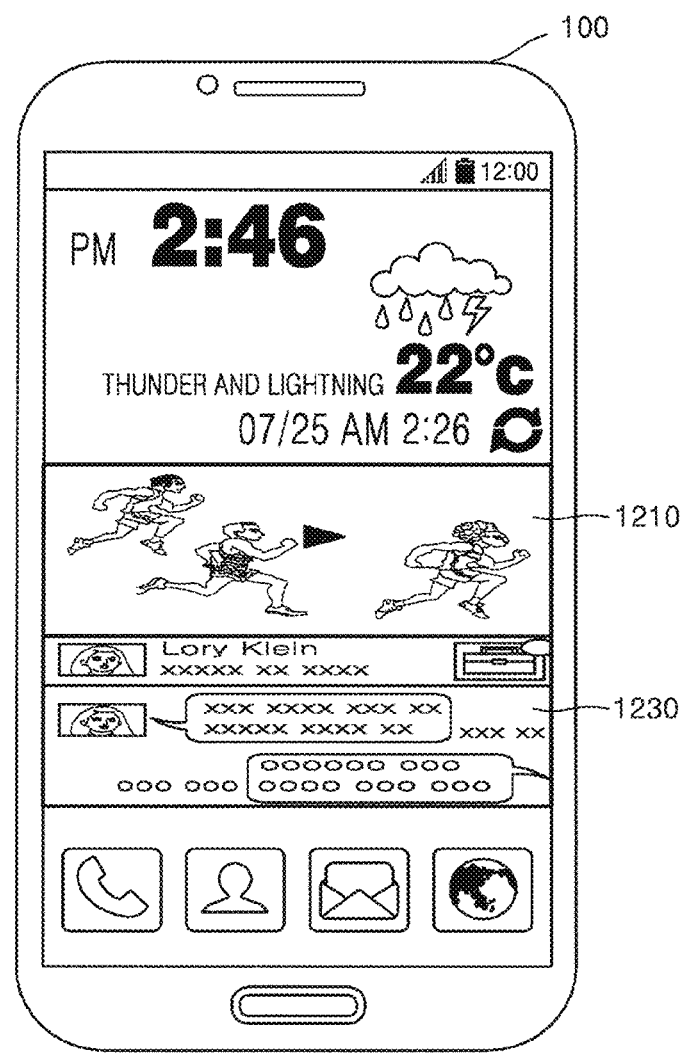
FIG. 12 illustrates two applications that are executed in a changed size, according to embodiments of the present disclosure.

FIG. 12 illustrates two applications that are executed in a changed size according to embodiments of the present disclosure.

When a video application is executed in a window 1210, a user may select an application icon of KAKAOTALK applicationon a wallpaper and, if a size change is performed, execute a KAKAOTALK application 1230 within a window having a changed size.

In this case, since multitasking is performed through a multi-window in a PC loading a window operating system (OS), a mobile terminal may enable a window 1210 executing a video application and a window 1230 executing a KAKAOTALK application to coexist and enable multitasking to be performed.

Figure 13A:
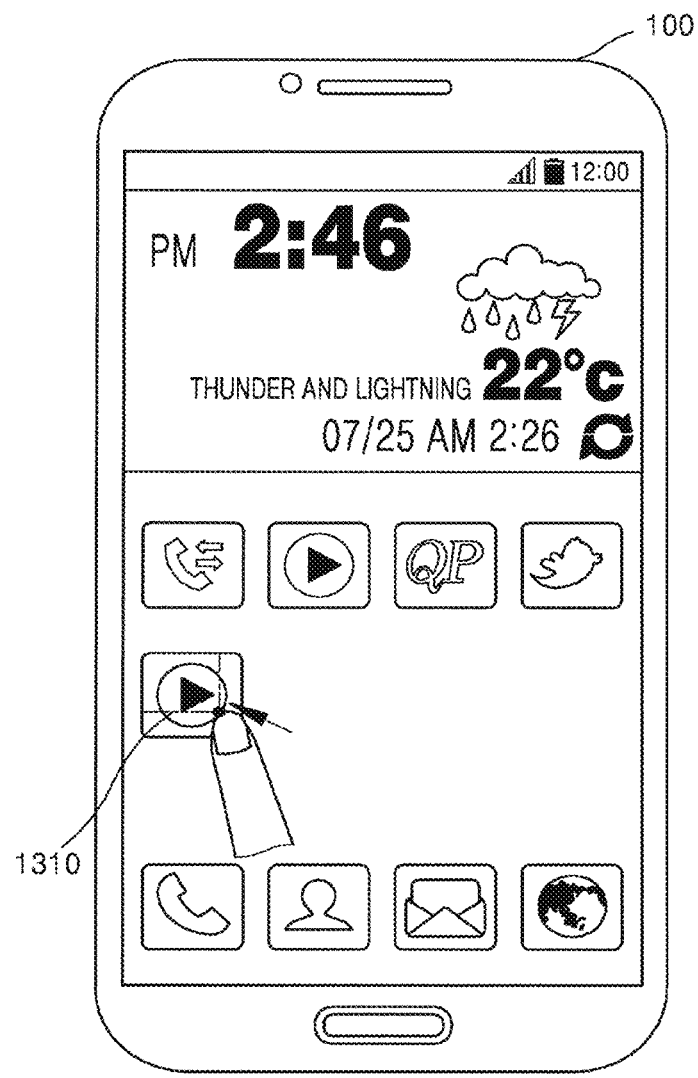
FIG. 13A illustrates a user input that is received for a size change after an application icon is added on a wallpaper of a smartphone, according to embodiments of the present disclosure.

FIG. 13A illustrates a user input that is received for a size change after an application icon is added onto a wallpaper of a smartphone, according to embodiments of the present disclosure.

A user may select an icon of a video application from an app drawer 1030 to add an application icon or a widget execution window onto a wallpaper 1010.

If the selection is completed, a mobile terminal may add a video application icon onto a wallpaper and display a size control box 1070 around the video application icon 1050.

The user may change the video application icon having a size of 1×1 into a smaller space 1310 of a size smaller than the size of 1×1.

Figure 13B:
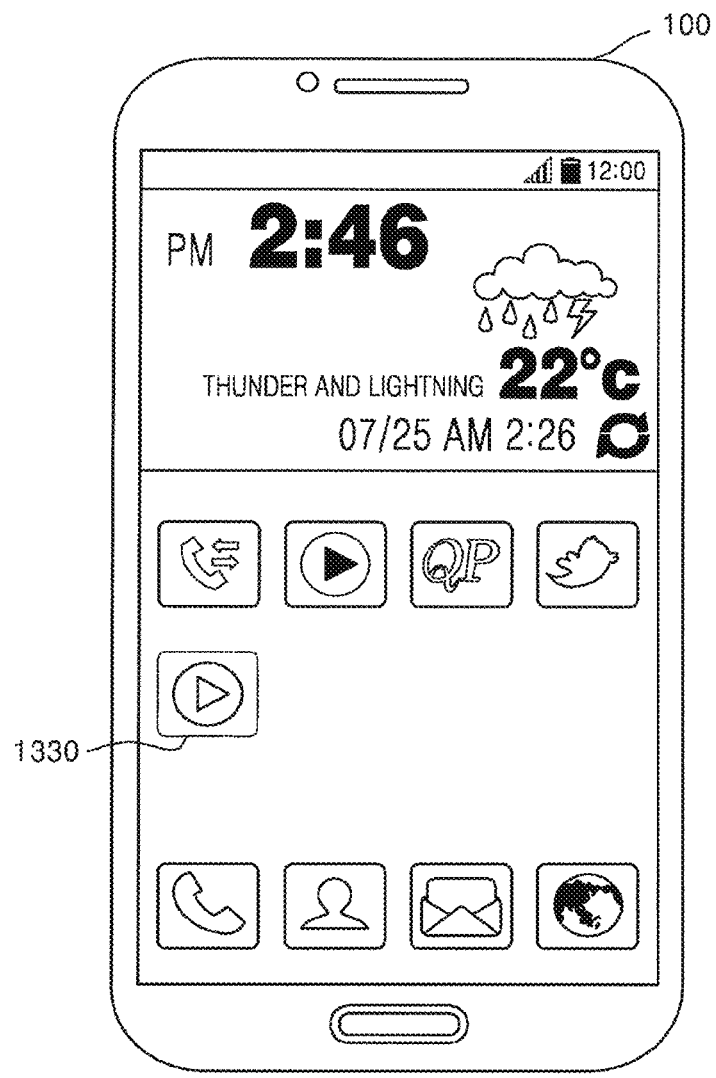
FIG. 13B illustrates an application icon that is deleted from a screen if a widget corresponding to a changed size does not exist, according to embodiments of the present disclosure.

FIG. 13B illustrates an application icon that is deleted from a screen if a widget corresponding to a changed size does not exist, according to embodiment s of the present disclosure.

If a user changes a video application icon 1330 having a size of 1×1 into a smaller space 1310 of a size smaller than the size of 1×1, the apparatus 100 may delete the video application icon 1330 that is added onto a wallpaper.

Figure 14A:
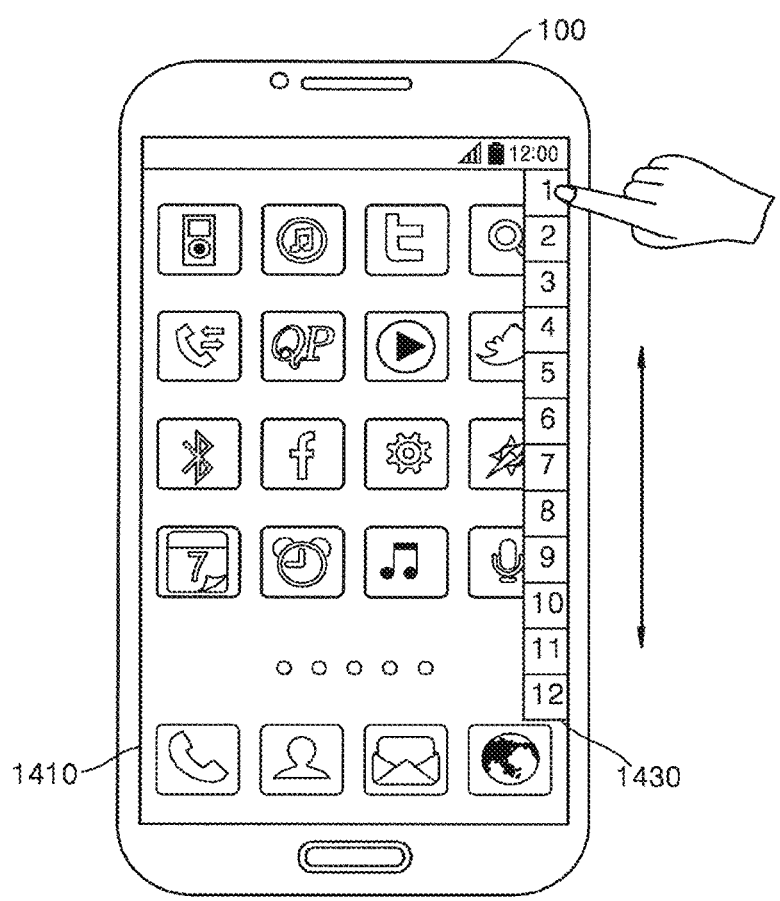
FIG. 14A illustrates a search method for assisting a selection of an application icon according to embodiments of the present disclosure.

FIG. 14A illustrates a search method for assisting a selection of an application icon according to embodiment s of the present disclosure.

If too many application icons are installed in a PC or a mobile terminal and thus are not displayed at a time on wallpaper, the apparatus 100 may provide a search method for assisting a selection of an application icon.

For example, the apparatus 100 may display a quick moving tab 1430 on aright edge of a screen 1410 that displays all of installed application icons.

Herein, the quick moving tab 1430 refers to an index that arranges objects to be searched for in preset order by using metadata, abbreviates arranged contents, and displays the abbreviated contents on one screen.

The quick moving tab 1430 may not always be positioned at a right edge of a screen and may exist in various shapes in various positions.

Examples of the preset order for arranging the objects to be searched for by using the metadata may include a date order, an alphabetic order, etc.

The quick moving tab 1430 may be automatically hidden when being not scrolled.

Figure 14B:
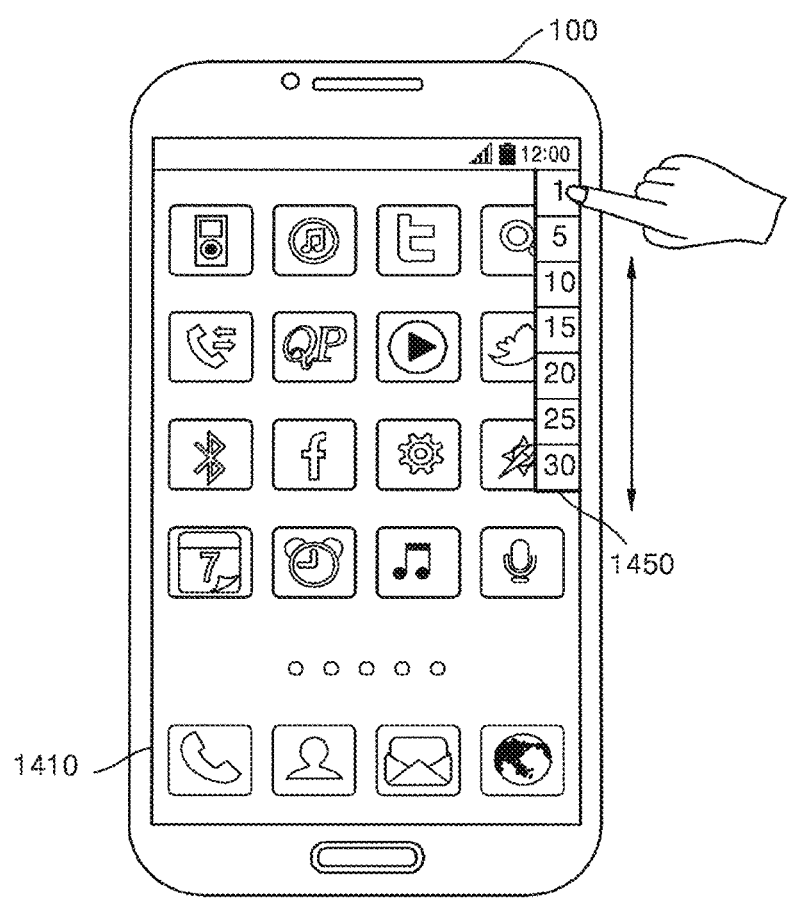
FIG. 14B illustrates a two-step quick moving tap for assisting a selection of an application icon according to embodiments of the present disclosure.

FIG. 14B illustrates a two-step quick moving tab that assists a selection of an application icon, according to embodiment s of the present disclosure.

The quick moving tab 1430 for searching for an object may include at least one step.

For example, the quick moving tab 1430 for searching for objects in a date order where applications are installed in a mobile terminal may have a one-step quick moving tab 1430 that monthly arranges applications and abbreviates arranged contents and a two-step quick moving tab 1450 that daily arranges applications and abbreviates arranged contents.

Here, if a user selects December on the one-step quick moving tab 1430, the apparatus 100 may display only application icons, which are installed in December, on a screen, change the one-step quick moving tab 1430, which may be monthly searched for, into the two-step quick moving tab 1450, which may be searched for by dates of December, and display the two-step quick moving tab 1450.

Herein, a search method using a quick moving tab may be used to search for an application icon, to search for a photo from a photo album application, or to search a phone number application for a phone number.

However, the use of the search method using the quick moving tab is not limited to the above-described embodiment.

It should be understood that embodiments described herein should be considered in a descriptive sense only and not for purposes of limitation. Descriptions of features or aspects within each embodiment should typically be considered as available for other similar features or aspects in other embodiments.

Although the present disclosure has been described with an embodiment, various changes and modifications may be suggested to one skilled in the art. It is intended that the present disclosure encompass such changes and modifications as fall within the scope of the appended claims.

What is claimed is:

1. A method of displaying an application by an application display device, the method comprising:
    receiving a first user input for selecting an application from an application drawer;
    in response to the first user input, adding an application icon of the selected application on the screen;
    receiving a second user input for a size change of the application icon added on the screen, wherein receiving the second user input further comprises:
        searching in the application display device and in a remote device for at least one widget corresponding to the application, and
        determining whether the searched-for at least one widget exists, wherein:
            if it is determined that the searched-for at least one widget exists, displaying a guide image according to an execution window size of the searched-for at least one widget; and
    determining a widget corresponding to the changed size among at least one widget of the application corresponding to the application icon, wherein:

when it is determined that a widget corresponding to the changed size exists, executing the determined widget, and when it is determined that a widget corresponding to the changed size does not exist:
if the changed size is smaller than a preset size, ending an execution of the application and deleting the application icon from the screen, and
if the changed size is larger than the preset size, executing the application in an area of the changed size.

2. The method of claim 1, further comprising:
receiving a user input for a size change of the execution window of the determined widget;
determining the application icon corresponding to a changed size of the execution window of the widget; and
displaying the application icon.

3. The method of claim 1, wherein the widget corresponding to the changed size is manually determined by a user input or is automatically determined according to a preset rule.

4. The method of claim 1, wherein horizontal and vertical lengths are changed in a preset size unit according to the user input for the size change.

5. The method of claim 1, wherein the user input is received from a touch of a user or an input device.

6. The method of claim 1, wherein the receiving of the user input comprises receiving a selection of the application icon through at least one of: a single touch, a single long touch, a multi-touch, a multi long touch, or an untouched input.

7. The method of claim 1, wherein the receiving of the user input comprises displaying a size control box around the application icon.

8. A method of displaying an application by an application display device, the method comprising:
receiving a first user input for selecting a widget from an application drawer;
in response to the first user input, adding the selected widget on the screen;
receiving a second user input for a size change of a widget execution window, wherein receiving the second user input further comprises:
searching in the application display device and in a remote device for at least one widget corresponding to the application,
determining whether the searched-for at least one widget exists, wherein
if it is determined that the searched-for at least one widget exits, displaying an execution window size of the searched-for at least one widget as a guide image; and
determining a widget corresponding to the changed size of the widget execution window among at least one widget of an application indicated by the widget execution window wherein:
when it is determined that a widget corresponding to the changed size exists, executing the determined widget, and
when it is determined that a widget corresponding to the changed size does not exist:
if the changed size is smaller than a preset size, ending an execution of the application and deleting the selected widget from the screen, and
if the changed size is larger than to the preset size, executing the application in an area of the changed size.

9. An apparatus for displaying an application, the apparatus comprising:
an input interface configured to:
receive a first user input for selecting an application from an application drawer, and
receive a second user input for a size change of the application icon added on the screen; and
a processor configured to:
in response to the first user input, add an application icon of the selected application on a screen
receive the second user input by:
searching in the application display device and in a remote device for at least one widget corresponding to the application,
determine whether the searched-for at least one widget exists, wherein:
if it is determined that the searched-for at least one widget exists, display a guide image according to an execution window size of the searched-for at least one widget, and
determine a widget corresponding to the changed size among at least one widget of the application corresponding to the application icon, wherein:
when it is determined that a widget corresponding to the changed size exists, execute the determined widget, and
when it is determined that a widget corresponding to the changed size does not exist:
if the changed size is smaller than a preset size, end an execution of the application and deleting the application icon from the screen, and
if the changed size is larger than to the preset size, execute the application in an area of the changed size.

10. The apparatus of claim 9, wherein:
the input interface is further configured to receive a user input for a size change of a widget execution window,
the processor is further configured to determine a widget corresponding to a changed size of the widget execution window among the at least one widget of an application indicated by the widget execution window, and
display is further configured to display an execution window of the determined widget.

11. The apparatus of claim 9, wherein:
the input interface is further configured to receive a user input for a size change of a widget execution window,
the processor is further configured to determine the application icon corresponding to a changed size of the widget execution window, and
display is further configured to display the application icon.

12. The apparatus of claim 9, wherein the processor is further configured to manually determine a widget corresponding to the changed size through a user input or automatically determines the widget according to a preset rule.

13. The apparatus of claim 9, wherein the input interface is further configured to receive the user input to change horizontal and vertical lengths in a preset size unit.

14. The apparatus of claim 9, wherein the input interface is further configured to receive the user input through a touch of a user or an input device, wherein the input device includes at least one of a touchable tool, a keyboard, or a mouse.

15. The apparatus of claim 9, wherein the input interface is further configured to receive a selection of the application icon through a single touch, a single long touch, a multi-touch, a multi long touch, or an untouched input.

16. The apparatus of claim 9, wherein the display is further configured to display a size control box around the application icon.

* * * * *